L. T. LYNN.
THREADING TOOL.
APPLICATION FILED NOV. 25, 1919.
1,382,841.
Patented June 28, 1921.
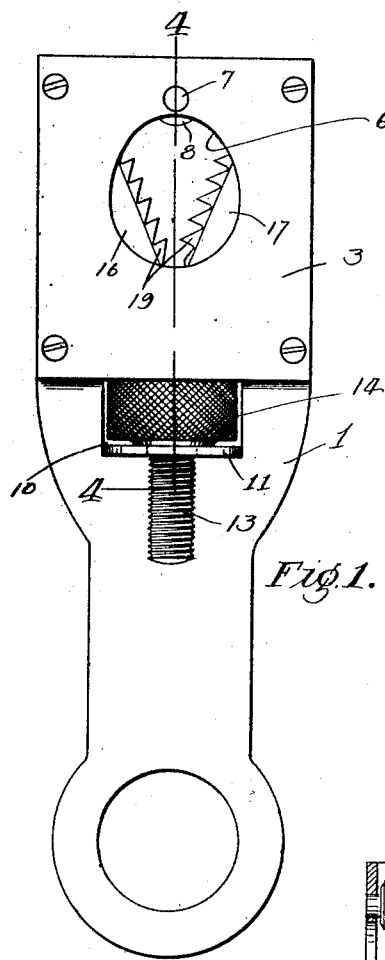
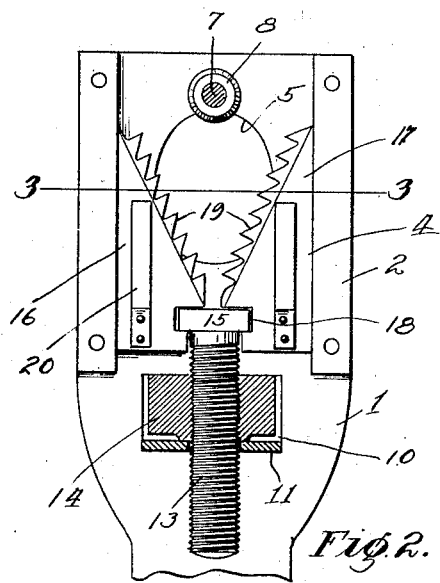
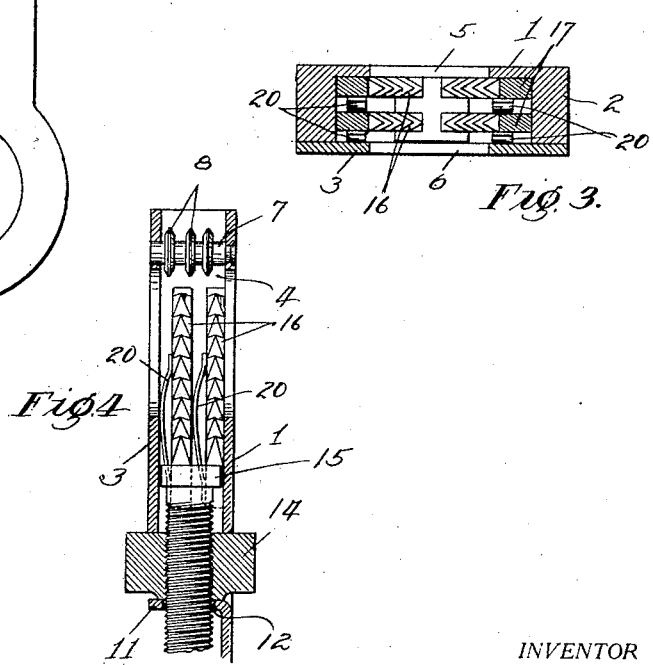
INVENTOR
Leon T. Lynn
BY
William A. Stock
ATTORNEYS

UNITED STATES PATENT OFFICE.

LEON T. LYNN, OF BERKELEY, CALIFORNIA.

THREADING-TOOL.

1,382,841.  Specification of Letters Patent.  Patented June 28, 1921.

Application filed November 25, 1919. Serial No. 340,675.

*To all whom it may concern:*

Be it known that I, LEON T. LYNN, citizen of the United States, residing at the city of Berkeley, in the county of Alameda and State of California, have invented certain new and useful Improvements in a Threading-Tool, of which the following is a specification.

This invention relates to improvements in threading tools and more particularly to a small hand operated device which is adapted for cleaning and recutting screw threads which have been marred or disfigured in use.

The principal object of the invention is to construct a device for the above purpose which is adjustable to fit various diameters of threads and which is self-adjusting for the various thread pitches.

A further object of the invention is to so construct the tool that it may be used on right or left hand threads without any manual adjustment, the cutting elements themselves being self-adjusting for the angle of the threads as well as for the pitch.

With these and other objects in view the invention consists in certain novel features of construction, combinations and arrangements of parts herein illustrated and more specifically pointed out in the appended claims.

Reference being had to the accompanying drawing forming a part of the specification:

Figure 1 is a view in front elevation of my improved screw threading tool.

Fig. 2 is a view in elevation of the working end of the tool with the cover plate removed to show the interior mechanism.

Fig. 3 is a view in cross section on the line 3—3 Fig. 2.

Fig. 4 is a view in section on the line 4—4 Fig. 1.

Referring to corresponding parts in the several views by the same numerals of reference, my tool comprises a flat plate 1, on the sides of which are spacing strips 2. Attached to these strips is a cover plate 3 which in connection with the plate 1 and side strips 2 forms a head having a hollow rectangular cavity 4 in which the mechanism is located. Plates 1 and 3 are provided with alining openings 5 and 6 through which is inserted the screw threaded member which is to be operated upon.

Adjacent one end of these openings, a pin 7 is mounted in the plates 1 and 3 and on this pin are revolubly mounted wheels 8. The outer edges of these wheels are V-shaped to correspond with the V of the standard screw threads, and the wheels are axially movable upon the pin to enable them to assume a distance corresponding to the pitch of the screw threads with which they may be engaged.

Below the tool head, an opening 10 is cut in the plate 1 and the flap formed by cutting this opening is bent at right angles to the plate as shown at 11 and this flap is provided with a circular opening 12 for the passage of the threaded end of bolt 13. Engaged on the thread of the latter is a knurled nut 14 which is thus positioned between the two sides of opening 10 and held against axial movement. The bolt is provided with a square head 15, the width of which is substantially the same as the distance between the inside surface of plates 1 and 2. This prevents the bolt from turning so that when the nut 14 is turned the bolt head will move longitudinally in cavity 4.

A plurality of cutting dies 16 and 17 are provided which are substantially triangular in shape, and each of which on its large end has a recess 18 that engages the head of bolt 13. Along the inner edges of the die members are formed cutting teeth 19. The teeth of one die are pointed in the opposite direction from those of the opposite member but in respect to the rotation of the tool when in use they point in the same direction. These die members do not occupy the full width of the cavity 4 and each is provided with a flat bowed spring 20 which holds it apart from the adjacent member or the side walls of the cavity. The members are somewhat loosely mounted on the head of the bolt and the teeth 19 are symmetrically inclined with respect to the longitudinal median line of the tool.

It will now be apparent that by turning the nut 14, the bolt 13 will be moved in or out of the cavity 4 and carry with it the cutting dies 16 and 17. As these dies move farther within the cavity, the distance between the inclined edges thereof and the wheels 8 grows less, hence enabling the tool to be used on smaller diameter bolt ends.

In use the device is applied to a screw threaded member by inserting the latter through the openings 5 and 6 and adjusting the cutting dies until they fully enter between the screw threads of the bolt. As previously described the wheels 8 will adjust themselves to seat in different threads and the same applies to the die members. These members being somewhat loosely mounted on the bolt head are free to space themselves laterally to engage differently spaced screw threads. Also on account of the bow spring mounting between the members, they may take an angle with respect to the surface of plate 1 which angle corresponds to that of the screw threads. Thus so far as the spacing of the threads is concerned, the cutting dies will adjust themselves laterally and it is only necessary to move the bolt 13 so that the proper contact is had between the screw threads and the teeth of the cutting dies.

When the tool is thus applied to the bolt, it is turned by means of the handle which extends on plate 1, and if there is sufficient thread left on the bolt to serve as a guide, the tool will quickly cut away the imperfect portions of the thread and reduce it to size.

The device may be used equally well on right or left hand threads, for by merely turning it up side down the cutting dies will point in the proper direction to cut a left hand thread, and the dies will adjust themselves to a corresponding opposite angle on the left hand thread.

While the tool is primarily intended for repairing threads already cut, it may be used to cut additional new threads on bolts already threaded. In this case the old threads serve as a guide to cause the dies to cut on a proper pitch.

While I have shown the preferred embodiment of my invention, it will be understood that changes within the scope of the claims may be made in proportions and minor features of design without departing from the spirit of the invention or sacrificing any of the advantages thereof.

Having thus described my invention I claim as new and wish to cover by Letters Patent:—

1. A tool for recutting screw threads comprising a head, supporting rollers revolubly mounted therein, die members slidably mounted therein and in opposition to said rollers, said die members being self-adjusting in a lateral direction within said frame.

2. A tool for recutting screw threads comprising a hollow head, supporting rollers revolubly mounted therein, opposing die members adjustable with respect to said rollers, said rollers being laterally movable in said head, and spring means permitting lateral and angular movement of said die members in said head.

3. A screw threading tool comprising a head having a rectangular cavity, a handle extending from said head, die members slidably mounted within said head, opposed faces on said die members inclined to the direction of movement thereof, cutting teeth formed on said faces and a supporting roller symmetrically disposed between said die members.

4. A tool for use in connection with screw threads comprising a frame, die members slidably mounted therein, opposed faces on said members inclined to the direction of movement thereof so as to form a V-shaped recess therebetween, cutting teeth on said opposed faces, means for adjusting and holding said die members and supporting rollers symmetrically disposed with respect to said V-shaped recess.

5. A tool for use in connection with screw threads comprising a frame, die members slidably mounted therein, opposed faces on said members inclined to the direction of movement thereof so as to form a V-shaped recess therebetween, cutting teeth on said opposed faces, means for adjusting and holding said die members, and supporting rollers mounted within said V-shaped recess so as to be capable of lateral movement.

6. A tool for use in connection with screw threads comprising a frame, die members slidably mounted therein, opposed faces on said members inclined to the direction of movement thereof so as to form a V-shaped recess therebetween, cutting teeth on said opposed faces, means for adjusting and holding said die members, means on the sides of said die members which will permit a lateral and angular movement thereof and supporting rollers revolubly mounted within said V-shaped recess.

7. A tool for use in connection with screw threads comprising a frame, die members slidably mounted therein, opposed faces on said members inclined to the direction of movement thereof so as to form a V-shaped recess therebetween, cutting teeth on said opposed faces, means for adjusting and holding said die members resilient means on the sides of said die members to permit a lateral movement thereof, and revolubly mounted supporting rollers symmetrically disposed with respect to said opposed faces.

8. A tool for use on screw threads comprising a frame having a hollow head, die members slidably mounted in opposite sides of said head, opposed inclined faces on said die members, cutting teeth formed on said faces, a bolt having one end of each die member loosely connected thereto, means for moving said bolt axially, and spring means adjacent each die member to permit lateral movement thereof.

9. A tool for use on screw threads comprising a frame having a hollow head, cutting dies slidably mounted in said head, a revoluble nut held by said frame against axial movement, a screw threaded member engaging said nut, means loosely connecting said member with one end of each cutting die, spring means adjacent each die member to permit a lateral and angular movement thereof, and means opposed to said cutting dies for supporting the screw threads being acted upon.

10. A tool for recutting screw threads comprising a head, die members slidably mounted therein, opposed cutting edges forming a V shaped recess therebetween, a longitudinally adjustable holding member, and means loosely connecting the die member to the holding member so as to allow self adjustment of said die members in a lateral and angular direction.

11. A tool for recutting screw threads comprising a head, die members slidably mounted therein, opposed cutting edges forming a V-shaped recess therebetween, an adjusting screw, an end thereon extending into said head and having said die members loosely held thereto, and supporting rollers symmetrically mounted within said V-shaped recess.

12. A screw-thread recutting tool comprising a frame, a plurality of die members each having a single line of longitudinally spaced cutting teeth, a part of the die members being placed in opposition to the others and forming a V-shaped recess therewith, supporting means symmetrically placed within said recess, an adjusting screw, and means loosely connecting the die members to the adjusting screw so that the former are capable of limited angular and lateral movements between themselves.

In testimony whereof I affix my signature.

LEON T. LYNN.